Patented Feb. 7, 1950

2,496,288

UNITED STATES PATENT OFFICE 2,496,288

PROCESS FOR THE SEPARATION AND RECOVERY OF INORGANIC SALTS

Clifford A. Hampel, Harvey, Ill., assignor to Cardox Corporation, Chicago, Ill., a corporation of Illinois No Drawing. Application March 20, 1947, Serial No. 736,113

7 Claims. (Cl. 23—85)

This invention relates to a process for the separation and recovery of sodium chloride and potassium chlorate from mixtures of these salts.

Mixtures containing sodium chloride and potassium chlorate are formed in the practice of several chemical processes. For example, such mixtures are formed upon reaction of dilute chlorine dioxide gas with a solution containing equivalent amounts of potassium and sodium hydroxides or carbonates. Additionally, the following reaction, as will be observed, results in the production of a mixture containing these salts:

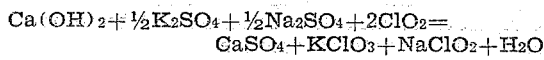

$$Ca(OH)_2 + \tfrac{1}{2}K_2SO_4 + \tfrac{1}{2}Na_2SO_4 + 2ClO_2 = CaSO_4 + KClO_3 + NaClO_2 + H_2O$$

The insoluble calcium sulfate is separated from the mixture by filtration leaving a solution containing equivalent amounts of sodium chlorite and potassium chlorate. Mixtures of sodium chlorite and potassium chlorate may be otherwise produced and the present invention is primarily concerned with and has as its object the provision of a process for expeditiously separating sodium chlorite and potassium chlorate from mixtures thereof, irrespective of the manner in which such mixtures are produced.

It has been ascertained that the amount of water required to keep the equi-mole mixture of sodium chlorite and potassium chlorate in solution will vary from about 38 moles of water per ½ mole of sodium chlorite plus ½ mole of potassium chlorate (1 mole of total salts) at 25° C., to about 15.5 moles of water at 60° C. As the temperature is lowered the amount of water required is greater and, of course, as the temperature increases the amount of water required to keep the equi-mole mixture of these salts in solution is less. It is to be borne in mind that the mole ratio of sodium chlorite to potassium chlorate need not always be 1 to 1. The ratio may be higher or lower and still permit of separation of the two salts in accordance with the process of the present invention.

When water is removed, at temperatures above 34° C., from a solution containing sodium chlorite and potassium chlorate in amounts up to about 92 mole percent sodium chlorite and 8 mole percent potassium chlorate, only the potassium chlorate will be precipitated after the solution becomes saturated. So long as the mole ratio of 92 sodium chlorite to 8 potassium chlorate is not exceeded, due to the precipitation of potassium chlorate from the solution, no sodium chlorite will be precipitated.

In accordance with the present invention, a solution containing both sodium chlorite and potassium chlorate is subjected to progressive evaporation at temperatures above 34° C., but below the temperature at which the decomposition of sodium chlorite becomes appreciable, and the extent of evaporation controlled so that the mole ratio of 92 sodium chlorite to 8 potassium chlorate is not exceeded to thereby precipitate potassium chlorate from the solution which is removed by filtration or centrifuging.

The water can be removed during the progressive evaporation under any desired pressure conditions, i. e., either atmospheric, sub-atmospheric or super-atmospheric pressure. Inasmuch as sodium chlorite in solution tends to decompose at elevated temperature, the evaporation temperature should be held sufficiently low so that objectionable sodium chlorite decomposition does not occur. The decomposition temperature of sodium chlorite varies somewhat with the pH of the solution as well as with the presence of other compounds. Prolonged heating of the sodium chlorite containing solution should also be avoided. However, it has been found that it is possible to adequately concentrate a sodium chlorite containing solution at atmospheric pressure without substantial deleterious decomposition of the chlorite.

Inasmuch as solid potassium chlorate is formed upon removal of water from the solution, the latter becomes more concentrated with respect to sodium chlorite and less concentrated with respect to potassium chlorate as the progressive evaporation proceeds. This action causes the mole ratio of sodium chlorite to potassium chlorate in the solution to progressively increase. When the mole ratio in the solution reaches about 92 sodium chlorite to 8 potassium chlorate, the progressive evaporation is stopped and the crop of solid potassium chlorate is removed by filtration or by centrifuging.

The mole ratio of about 92 sodium chlorite to 8 potassium chlorate represents the eutectic composition of solutions thereof at temperatures up to about 34° C. The amount of water associated with any given quantity of sodium chlorite and potassium chlorate in the above ratio as a eutectic solution will vary with the temperature. The higher the temperature, the less is the amount of water required to keep a given amount of a 92 sodium chlorite to 8 potassium chlorate mixture in solution.

When water is removed from the eutectic mixture at its saturation temperature, a solid mixture containing both sodium chlorite and potassium chlorate will be precipitated in exactly the same ratio as they exist in the solution. Furthermore, as a eutectic solution of sodium chlorite and potassium chlorate is cooled below its saturation temperature, i. e., temperatures below 34° C. there will be precipitated a solid mixture of sodium chlorite and potassium chlorate of the same ratio of these solids as prevails in the solution.

It follows that when a solution of sodium chlorite and potassium chlorate whose mole ratio content is less than 92 sodium chlorite to 8 potassium chlorate is evaporated to the eutectic ratio of sodium chlorite to potassium chlorate, the same quantity of potassium chlorate will be deposited as a solid no matter whether sufficient water is removed to equal 0° C. eutectic composition or the 34° C. eutectic composition. The respective eutectic solution compositions at temperatures up to 34° C. depend upon a corresponding water content. If water is removed from the 5° C. eutectic solution, for example, the temperature must be maintained at a higher point to keep both of the salts in solution. This relationship, however, holds only up to about 34° C. for this particular system. At temperatures above 34° C. the eutectic solution compositions will no longer remain at the mole ratio of 92 sodium chlorite to 8 potassium chlorate. At these higher temperatures the solutions become less rich in sodium chlorite.

When the progressive evaporation, accompanied by separation of potassium chlorate, has proceeded to a point where the mole ratio of sodium chlorite to potassium chlorate is approximately 92 sodium chlorite to 8 potassium chlorate, the remaining solution or filtrate can be further treated for the recovery of sodium chlorite. Alternative procedures may be followed from this point forward in the recovery of sodium chlorite and, if desired, some additional potassium chlorate.

One of the alternative procedures for treating this solution, following the progressive evaporation and at a time when the mole ratio of sodium chlorite to potassium chlorate in the solution is of the order of 92 sodium chlorite to 8 potassium chlorate, is as follows. The solution is at a temperature well above 34° C. and approximately 60° C. and, therefore, well above the transition temperature of sodium chlorite so that the solution at this point contains no $NaClO_2 \cdot 3H_2O$ crystals. By cooling the solution to a temperature of about 25° C., and in the absence of $NaClO_2 \cdot 3H_2O$ crystals, a further crop of potassium chlorate can be precipitated and separated from the solution. The remaining solution may then be seeded with a few $NaClO_2 \cdot 3H_2O$ crystals and a very substantial amount of sodium chlorite precipitated as $NaClO_2 \cdot 3H_2O$. The mother liquor from the latter step is advantageously recycled to the initial progressive evaporation step. Where anhydrous chlorite is desired, the precipitated and separated $NaClO_2 \cdot 3H_2O$ may be heated to a temperature above 38° C., the transition temperature thereof, to insure against the presence of $NaClO_2 \cdot 3H_2O$ crystals and the thus heated solution cooled down to a temperature of 25° C. in the absence of $NaClO_2 \cdot 3H_2O$ crystals, under which conditions a substantial amount of anhydrous sodium chlorite can be precipitated and separated out. Indeed, it has been discovered that a super-saturated solution of $NaClO_2$ which has been heated above the transition temperature to insure against the presence of $NaClO_2 \cdot 3H_2O$ crystals can be cooled to a temperature of the order of 25° C. without reconversion of $NaClO_2 \cdot 3H_2O$ crystals to effect precipitation of anhydrous sodium chlorite.

In the foregoing outlined procedure, if desired, the mother liquor, following the precipitation and separation of $NaClO_2 \cdot 3H_2O$, instead of being directly recycled to the progressive evaporation step, may be evaporated separately at a temperature of the order of 60° C. and filtered hot to precipitate out additional anhydrous sodium chlorite, the resulting filtrate being then recycled to the initial progressive evaporation step.

An alternative procedure for recovery of sodium chlorite and, if desired, some additional potassium chlorate from the solution leaving the progressive evaporation step of the process, which solution, as has been noted, has a mole ratio of sodium chlorite to potassium chlorate of about 92 sodium chlorite to 8 potassium chlorate, is as follows: The solution leaving the progressive evaporation step may be further concentrated by driving off some additional water at a temperature of the order of 60° C. and then filtered at this temperature to separate out anhydrous sodium chlorite. The filtrate, following the separation of anhydrous sodium chlorite, may be directly recycled to the progressive evaporation step of the process or, if desired, this filtrate may be cooled to a temperature of approximately 34° C. to precipitate some additional potassium chlorate, which is filtered out at this temperature, and the remaining filtrate then recycled to the progressive evaporation step of the process.

Still a further alternative procedure for treating the solution leaving the progressive evaporation step of the process and which solution, as stated, has a mole ratio of sodium chlorite to potassium chlorate of about 92 sodium chlorite to 8 potassium chlorate, is as follows: The solution may be progressively cooled down to a temperature of the order of 15° C., at which temperature there will be precipitated a mixture of potassium chlorate and $NaClO_2 \cdot 3H_2O$ in the same ratio as these compounds occupy in the solution. The mixture may be separated out by filtration and then heated to a temperature of the order of 45° C., at which temperature anhydrous sodium chlorite may be filtered out and the filtrate recycled to the initial progressive evaporation step of the process.

The following constitute examples of the various procedures which may be carried out pursuant to the present invention.

*Example 1*

Fifteen hundred and sixty-three parts of a solution composed of 5.75% $NaClO_2$, 7.85% $KClO_3$ and 86.4% $H_2O$ were progressively evaporated stepwise at over 34° C., the $KClO_3$ precipitated being filtered off at intervals as the evaporation went on. After a total of 1,271 parts of water had been evaporated, the solution composition at 34° C. was 50% $NaClO_2$, 5.5% $KClO_3$ and 44.5% $H_2O$. The total $KClO_3$ recovered as a solid at temperatures of 34° C. or over amounted to 111 parts.

The filtrate at 34° C. was again evaporated at a temperature over 60° C. until 40.4 parts of water had been removed. By filtering the resultant slurry at 60° C., 45 parts of solid anhydrous $NaClO_2$ were separated leaving a solution whose composition was 47.2% $NaClO_2$, 10.8% $KClO_3$ and 42% $H_2O$. After the $NaClO_2$ crop had been obtained the filtrate was added to another batch of the starting solution and the mixture was put thru a second cycle similar to the one described.

In an alternative operation, the filtrate was cooled to 34° C. and a second crop of 5.3 parts of $KClO_3$ separated. The mother liquor from this 34° C. filtration was added to another batch.

On the second cycle a larger percentage of $NaClO_2$ is recovered than was taken out in the initial cycle and after a few cycles the amounts of $KClO_3$ and $NaClO_2$ separated become equal to the amounts in the fresh solution added for each cycle.

Example 2

To 151.2 parts of the mother liquor from a previous cycle was added a solution having a 1:1 mole ratio $NaClO_2$:$KClO_3$ and containing 90.5 parts $NaClO_2$, 122.6 parts $KClO_3$ and 1,350 parts $H_2O$. The combined solution was progressively evaporated with separation at several points of the solid $KClO_3$ formed during the water removal until the solution composition reached 47.2% $NaClO_2$, 10.8% $KClO_3$ and 42.0% $H_2O$ at 60° C. The solution was then cooled in the absence of any solid sodium chlorite trihydrate to 25° C. and more $KClO_3$ was filtered off as a solid. The total $KClO_3$ separated as a solid during the evaporation and this cooling amounted to 122.6 parts. After all of the solid $KClO_3$ had been removed the filtrate was seeded with a few crystals of $$NaClO_2 \cdot 3H_2O$$

When the temperature had again reached 25° C., a crop of 144.5 parts of $NaClO_2 \cdot 3H_2O$ was recovered by filtration. This sodium chlorite crystal crop contained the equivalent of 90.5 parts of anhydrous $NaClO_2$. The mother liquor, composed of 63.2 parts $NaClO_2$, 7.4 parts $KClO_3$ and 80.6 parts of $H_2O$, was recycled from this operation along with the next batch.

To obtain anhydrous $NaClO_2$ the $NaClO_2 \cdot 3H_2O$ crystals were heated above about 38° C., the transition temperature in the absence of other salts, to form a slurry of solid anhydrous $NaClO_2$ in a saturated sodium chlorite solution. After the crystals were melted they were cooled to a temperature below the transition temperature, in the absence of $NaClO_2 \cdot 3H_2O$, and the solid $NaClO_2$ separated by filtration.

Example 3

The mother liquor from Example 2, consisting of a solution, at 25° C., of 63.2 parts of $NaClO_2$, 7.4 parts of $KClO_3$ and 80.6 parts of $H_2O$ was evaporated until the mixture contained 64.3% $NaClO_2$, 7.2% $KClO_3$ and 28.5% $H_2O$. The water removed was 52.9 parts. This mixture was a slurry containing solid $NaClO_2$, and by filtering at 60° C., a crop of 31.6 parts of solid anhydrous $NaClO_2$ was recovered, leaving as a filtrate 66.7 parts of a solution of composition 47.2% $NaClO_2$, 10.8% $KClO_3$ and 42.0% $H_2O$. This final filtrate was recycled with the next batch being treated.

Example 4

A mother liquor from a previous batch containing 19.2 parts $KClO_3$, 84.0 parts $NaClO_2$ and 74.5 parts of $H_2O$ was mixed with a fresh solution of 122.6 parts $KClO_3$, 90.5 parts $NaClO_2$ and 1,350 parts $H_2O$. The combined solution was progressively evaporated until the solution portion of the slurry at 34° C. contained 50% $NaClO_2$, 5.5% $KClO_3$ and 44.5% $H_2O$. During the evaporation of the 1269.2 parts of water needed to reach this point, a total of 122.6 parts of solid $KClO_3$ formed and was separated by filtration at several intervals. After the final $KClO_3$ removal, the remaining 349 parts of mother liquor was cooled stepwise to 15° C. to cause the precipitation of a solid mixture totaling 14.3 parts of $KClO_3$ and 201.2 parts of $NaClO_2 \cdot 3H_2O$ which was filtered off at 15° C.

The 133.5 parts of filtrate were recycled with the next batch. The above solid mixture was heated to dissolve all of the $KClO_3$, the $$NaClO_2 \cdot 3H_2O$$

being decomposed to $NaClO_2$ and $H_2O$ by the heating. Sodium chlorite in the amount of 39.0 parts remained as a solid and was recovered by filtration at this temperature of about 45° C. The mother liquor was added to the next batch.

Certain operations for the manufacture of sodium chlorite and potassium chlorate will yield solid mixtures of coprecipitated $NaClO_2 \cdot 3H_2O$ and $KClO_3$. Such mixtures can be separated by following the treatment outlined in the latter part of Example 4 above, consisting of heating the mixture above the $NaClO_2 \cdot 3H_2O$ transition temperature to such a temperature that all of the $KClO_3$ is dissolved in the water associated with the $NaClO_2 \cdot 3H_2O$. While most of the water will come from the water of crystallization of the sodium chlorite trihydrate, some will be derived from the mother liquor adhering to such a solid mixture after the filtration or washing.

Assuming, however, that all of the water which will be present upon heating such a mixture above 34° C. comes from the trihydrate, the maximum $KClO_3$ content of mixtures amenable to this separation method will be between 20 and 25% $KClO_3$ on a dry basis. Such a mixture may be heated to near the boiling point of the resultant slurry to dissolve all of the $KClO_3$ contained therein.

Solid mixtures of $NaClO_2$ and $KClO_3$ containing more than 20-25% $KClO_3$ on the dry basis may be separated by adding sufficient water to bring all of the $NaClO_2$ into solution at some temperature above about 34° C., then cooling to some temperature below this initial one but not less than about 34° C. to precipitate $KClO_3$, and then following one of the modes of operation previously described to precipitate $NaClO_2$ and possibly more $KClO_3$. Here again, the cooling and precipitation of solid $KClO_3$ may be carried to less than about 34° C. if the solution is kept supersaturated with respect to $NaClO_2$.

Procedures have been described whereby any mixture of sodium chlorite and potassium chlorate, either solid or in solution, may be treated for the separate recovery of both salts. It may be pointed out that any solution containing $NaClO_2$ and $KClO_3$ in ratios less than about 90% $NaClO_2$ to 10% $KClO_3$ by weight and $H_2O$ in the ratio of at least about 47% $H_2O$ to 53% $NaClO_2$ by weight at any temperature will precipitate $KClO_3$ only when cooled to a lower temperature.

In any case the precipitation of one salt only can proceed only until the solution remaining contains $NaClO_2$ and $KClO_3$ in a weight ratio of about 9 to 1. Cooling of any solution of this $NaClO_2$ to $KClO_3$ ratio will cause the two salts to be deposited as a mixture of this ratio. The weight ratio of 90 $NaClO_2$ to 10 $KClO_3$ corresponds to a mole ratio of 92 to 8.

Reference is made to the following copending applications which are related to the invention herein disclosed; application S. N. 647,396, now Patent No. 2,489,571, which discloses a process for the preparation of perchlorates and chlorites of different metals; application S. N. 647,403, now Patent No. 2,489,572, which relates to a process for the preparation of chlorine dioxide and a metal perchlorate; application S. N. 647,404, now Patent No. 2,489,573, which relates to a process for the preparation of chlorates and chlorites of different metals; and application S. N. 756,542 which relates to a process for the resolution of mixtures of sodium chlorate and sodium chlorite.

Having thus described my invention, what I claim is:

1. A process for the separation of sodium chlorite and potassium chlorate from solutions containing these salts which comprises progressively evaporating the solution at temperatures above 34° C. so as to crystallize potassium chlorate until the solution reaches the eutectic composition having a saturation temperature of about 34° C., separating the thus crystallized potassium chlorate, thereafter cooling the remaining solution below 34° C. to crystallize a mixture of potassium chlorate and $NaClO_2 \cdot 3H_2O$, separating the mixture from the mother liquor, heating the mixture above the transition point of $NaClO_2 \cdot 3H_2O$ to dissolve the potassium chlorate and to form a slurry of solid anhydrous sodium chlorite in a saturated solution thereof, and separating the solid sodium chlorite from the heated solution.

2. A process for the separation of sodium chlorite and potassium chlorate from solutions containing these salts which comprises progressively evaporating the solution at a temperature above 34° C. to crystallize potassium chlorate until solution approximates the eutectic composition having a saturation temperature of about 34° C., separating the potassium chlorate thus crystallized, thereafter recovering sodium chlorite from the remaining solution by evaporating said remaining solution at a temperature higher than that of the initial evaporation until the solution is saturated with respect to the residual potassium chlorate so as to crystallize anhydrous sodium chlorite, separating the thus crystallized anhydrous sodium chlorite from the mother liquor at such higher temperature, and thereafter cooling the mother liquor to 34° C. so as to crystallize therefrom additional amounts of potassium chlorate.

3. A process for the separation of sodium chlorite and potassium chlorate from solutions containing these salts which comprises progressively evaporating the solution at a temperature above 34° C. to crystallize potassium chlorate until solution approximates the eutectic composition having a saturation temperature of about 34° C., separating the potassium chlorate thus crystallized, and thereafter cooling the remaining solution in the absence of solid $NaClO_2 \cdot 3H_2O$ to about 25° C. and separating therefrom at said lower temperature an additional amount of crystallized potassium chlorate, thereafter seeding the remaining solution with $NaClO_2 \cdot 3H_2O$ crystals to crystallize $NaClO_2 \cdot 3H_2O$, and separating the thus crystallized $NaClO_2 \cdot 3H_2O$ from the mother liquor.

4. A process according to claim 3 in which the mother liquor is subjected to further concentration at a temperature higher than that of the initial evaporation until the solution is saturated with respect to potassium chlorate so as to crystallize anhydrous sodium chlorite only, and separating the thus crystallized anhydrous sodium chlorite at such higher temperature.

5. A process for the separation of sodium chlorite and potassium chlorate from solutions containing these salts which comprises progressively evaporating the solution at a temperature above 34° C. to crystallize potassium chlorate until solution approximates the eutectic composition having a saturation temperature of about 34° C., separating the potassium chlorate thus crystallized, and thereafter cooling the remaining solution in the absence of solid $NaClO_2 \cdot 3H_2O$ to about 25° C. and separating therefrom at said lower temperature an additional amount of crystallized potassium chlorate, thereafter seeding the remaining solution with $NaClO_2 \cdot 3H_2O$ crystals to crystallize $NaClO_2 \cdot 3H_2O$, separating the thus crystallized $NaClO_2 \cdot 3H_2O$ from the mother liquor, and recycling the mother liquor to the initial evaporation step.

6. A process for the separation of sodium chlorite and potassium chlorate from solutions containing these salts which comprises progressively evaporating the solution at a temperature above 34° C. to crystallize potassium chlorate until solution approximates the eutectic composition having a saturation temperature of about 34° C., separating the potassium chlorate thus crystallized, and thereafter cooling the remaining solution in the absence of solid $NaClO_2 \cdot 3H_2O$ to about 25° C. and separating therefrom at said lower temperature an additional amount of crystallized potassium chlorate, thereafter seeding the remaining solution with $NaClO_2 \cdot 3H_2O$ crystals to crystallize $NaClO_2 \cdot 3H_2O$, separating the thus crystallized $NaClO_2 \cdot 3H_2O$ from the mother liquor, heating the crystallized $$NaClO_2 \cdot 3H_2O$$

to a temperature above 38° C. to form a slurry of solid anhydrous sodium chlorite in a saturated solution of the same, cooling the solution substantially below 38° C., in the absence of solid $NaClO_2 \cdot 3H_2O$, and separating the crystallized anhydrous sodium chlorite therefrom.

7. A process according to claim 6 in which the saturated solution of anhydrous sodium chlorite is cooled to about 45° C.

CLIFFORD A. HAMPEL.

REFERENCES CITED

The following references are of record in the file of this patent:

UNITED STATES PATENTS

| Number | Name | Date |
| --- | --- | --- |
| 2,031,681 | Vincent | Feb. 25, 1936 |
| 2,046,830 | Logan | July 7, 1936 |
| 2,169,066 | Cunningham | Aug. 8, 1939 |

OTHER REFERENCES

Seidell: Solubilities of Inorg. and Org. Compounds, vol. I, D. Van Nostrand Co., New York, 1919, pp. 513 and 639.

Mellor: Treatise on Inorganic and Theoretical Chemistry, vol. 2, Longmans, Green & Co., New York city, 1922, pp. 282 and 283.